United States Patent [19]

Collins et al.

[11] Patent Number: 4,739,656
[45] Date of Patent: Apr. 26, 1988

[54] FLOW SENSING DEVICE

[75] Inventors: Roderick J. Collins, Ormskirk; Peter A. A. Bode, Oldham, both of England

[73] Assignee: IMI Pactrol Limited, Skelmersdale, England

[21] Appl. No.: 911,387

[22] Filed: Sep. 25, 1986

[30] Foreign Application Priority Data

Sep. 25, 1985 [GB] United Kingdom ............... 8523684

[51] Int. Cl.$^4$ .............................................. G01F 1/68
[52] U.S. Cl. ...................................................... 73/204
[58] Field of Search ............................... 73/204, 118.2

[56] References Cited

U.S. PATENT DOCUMENTS 3,968,685  7/1976  MacHattie ............................ 73/204
3,992,940  11/1976  Platzer, Jr. ............................ 73/204

FOREIGN PATENT DOCUMENTS 1098077  1/1968  United Kingdom ................. 73/204
2138566  10/1984  United Kingdom ................. 73/204

Primary Examiner—Herbert Goldstein
Attorney, Agent, or Firm—John S. Hale

[57] ABSTRACT

A fluid flow sensing device comprises first and second p-n junctions, one of which is arranged to be disposed in the fluid flow to be measured and the other of which is arranged to be disposed at a position such that its temperature depends only on that of the fluid. An amplifier monitors the voltage drop across the first p-n junction. A comparator compares the measured voltage drop across the first p-n junction with a reference level to provide a feedback voltage which is used to control the heating of the first p-n junction such as to maintain the temperature of that junction constant irrespective of variations in the fluid flow or the fluid temperature. A current is passed through the second p-n junction and the voltage drop across it is monitored and compared with the feedback voltage to provide a signal which is a function of fluid flow alone.

6 Claims, 4 Drawing Sheets

FLOW SENSING DEVICE

The present invention relates to a flow sensing device, and in particular, but not exclusively, to a device for measuring the flow of air into a domestic water heater.

Modern domestic water heaters are provided with an electrically-operated fan to impel air into the heater and produce more efficient combustion of the fuel. It is a safety requirement that the heater should not be operable unless the fan is in operation, since combustion of the fuel without sufficient air may be dangerous.

In an attempt to comply with this requirement, many heaters have a pressure-operated switch situated between the fan and the burner of the heater which, when the fan is working, causes the pressure operated switch to allow a valve to open controlling the input of the fuel. If the fan is not in operation, the pressure between the fan and the burner will be reduced, and the pressure-operated switch prevents the fuel control valve from opening. However, if the path of air through the heater is blocked, e.g. in the exhaust flue, the pressure-operated switch will allow fuel to flow, with potentially serious results.

An alternative, electronic solution is to have a heated thermistor in the flow of the air. The flow of air across the thermistor tends to cool the thermistor which, because of a feedback system to an operational amplifier, is arranged to be heated up to the same temperature as previously. The voltage applied to the thermistor to keep it at a constant temperature is thus proportional to the flow of air past the thermistor. Compensation for the temperature of the air is obtained by a second, unheated, thermistor which detects the temperature of the air and whose voltage (which is due solely to air temperature) is subtracted from the voltage obtained from the first thermistor (which is due to the flow of air and the temperature of the air) to give a voltage which corresponds solely to the flow of air. However, the components used are relatively expensive and it is difficult to match the (non-linear) resistance/temperature characteristics of the two thermistors accurately, thus introducing temperature compensation errors. Furthermore, the thermistors themselves are relatively fragile and tend to require frequent replacement. It is also found that many thermistors are not sensitive to higher flow rates of air.

It is an object of the present invention to provide a flow sensing device which overcomes or reduces the above problems.

In accordance with the present invention, there is provided a fluid flow sensing device comprising first and second p-n junctions, one of which is arranged, in use, to be disposed in the fluid flow to be measured and the other of which is arranged to be disposed at a position such that its temperature depends only on that of said fluid, means for monitoring the voltage drop across the first p-n junction, means for heating the first p-n junction, means for comparing the measured voltage drop across the first p-n junction with a reference level to provide a feedback voltage which is used to control the heating means of the first p-n junction in such a manner as to maintain the temperature of that junction constant irrespective of variations in the fluid flow or the fluid temperature, means for passing a current through the second p-n junction, means for monitoring the voltage drop across the second p-n junction, and means for comparing the voltage drop across the second p-n junction with said feedback voltage to provide a signal which is a function of fluid flow.

There is also provided a device for regulating the operation of an apparatus, comprising means adapted to be positioned in the flow of a fluid, the electrical resistance of said means being proportioned to its temperature and variations in its resistance being used to control the actuation of said apparatus.

The invention is described further hereinafter, by way of example only, with reference to the accompanying drawings, in which.

Figure 1:
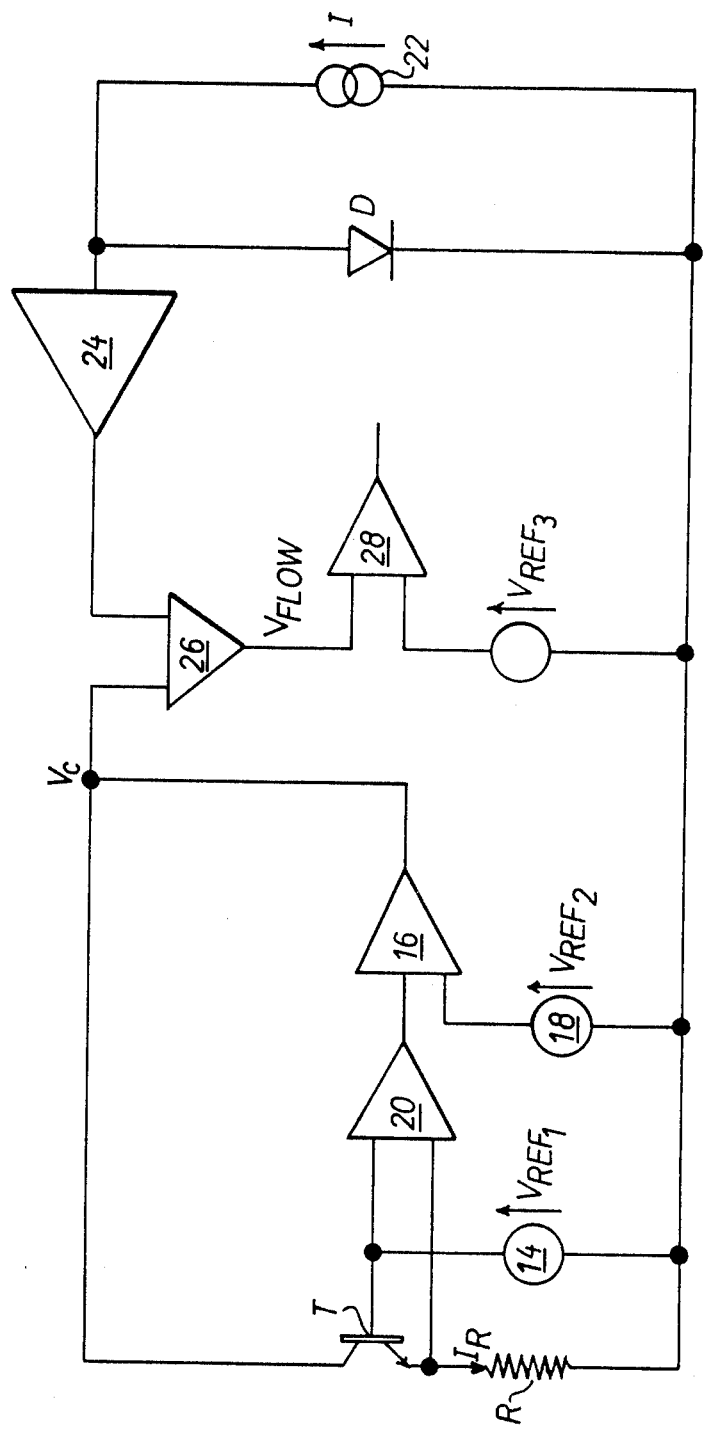
FIG. 1 is a circuit diagram of one embodiment of a flow sensing device in accordance with the present invention.

The flow sensing device of FIG. 1 comprises an npn transistor T which is arranged to form a constant current device by the provision of a first reference voltage source 14, which produces a voltage $V_{REF1}$, and an emitter resistor R. Provided that $V_{REF1}$ is much greater than the base emitter voltage $V_{be}$, then a voltage substantially equal to $V_{REF1}$ is established across the resistor R, resulting in a current $I_R$ in the transistor which is substantially constant, irrespective of variations in the collector load. The collector of the transistor T is connected to the output of an operational amplifier 16 whose inputs are connected respectively to a second reference voltage source 18, producing a voltage $V_{REF2}$, and the output of a second operational amplifier 20. Amplifier 20 is a differential amplifier which provides at its output a measure of the base-emitter voltage $V_{be}$ of the transistor T. The amplifier 16 compares this measure of the base-emitter voltage with the reference voltage $V_{REF2}$ and controls the voltage on the collector of transistor T to maintain this comparison, and hence the base-emitter voltage, at a constant level. With a constant current being passed through the transistor T, its temperature varies with the voltage impressed on its collector as a result of the differing power to be dissipated. At the same time, a measure of the transistor junction temperature is obtained by measuring its base-emitter voltage.

Thus, it will be seen that the transistor T is self-heated by the current passing through it and which, by virtue of voltage feedback arrangement described above, is maintained at a constant junction temperature (typically between 100° C.–180° C.), the temperature being predetermined by fixing the reference voltage $V_{REF2}$ of the amplifier 20.

In use, the transistor T is placed in the airflow of a heater, between the fan and the burner, such that the flow of air attempts to lower the temperature of the transistor. However, because of the feedback heating system, the base-emitter junction of the transistor is maintained at a constant temperature by the automatic increase or decrease of the voltage applied to the transistor collector.

Figure 2:
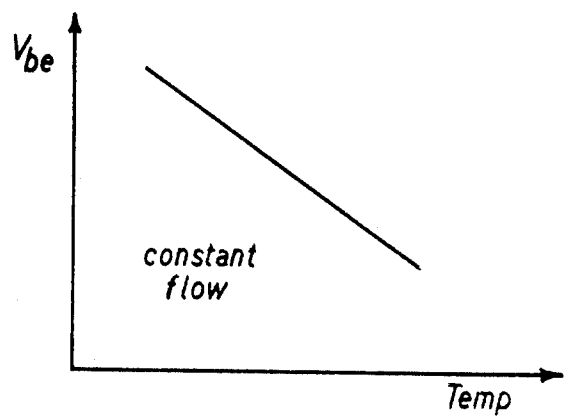
FIG. 2 is a graph of base-emitter voltage against temperature for a transistor used in the device of FIG. 1.
Figure 3:
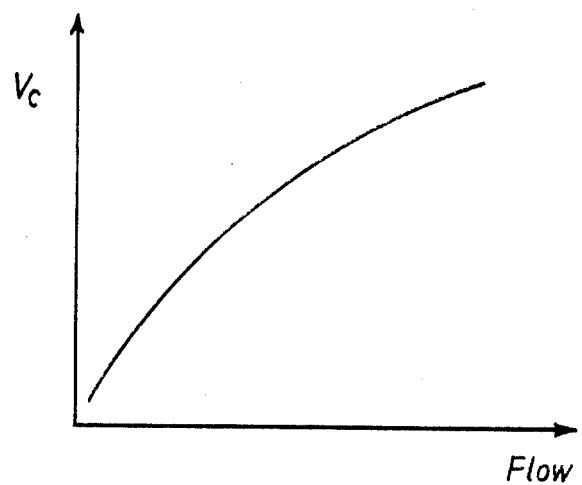
FIG. 3 is a graph of collector voltage against fluid flow for the transistor used in the device of FIG. 1.

As indicated diagrammatically in FIG. 2, for a constant air flow over the transistor, the junction voltage ($V_{be}$) varies linearly with temperature. When, however, the temperature of the junction is maintained constant by means of the feedback arrangement described above, then a characteristic curve of the output voltage of comparator 16 against flow as shown in Fig.3 is obtained. For a given air temperature, therefore, the output of the comparator 16, and hence the heating voltage ($V_c$) applied to the transistor, is a function of the flow of air past the transistor T.

As in the known devices, compensation must be made for the actual temperature of the air whose flow is being measured. This is achieved by means of a diode D which is unheated other than as a result of the temperature of the air itself. The diode D is supplied with a constant current I from a constant current source 22, the voltage on the diode D being fed into a conditioning amplifier 24. When a constant current is being passed through it, the voltage across the diode varies in a linear manner with temperature (in a manner similar to the curve of Fig.2, although not necessarily of the same slope). When the slopes have been matched, for example by varying the gain of amplifier 24, the output signal of the amplifier 24 (which is due only to the temperature of the air) is subtracted from the output signal of the amplifier 16 (which is due to the temperature of the air and to the flow of air) by a differential amplifier 26 to produce a signal $V_{FLOW}$ which is due only to the flow of air. It will be appreciated in this connection that the implementation of temperature compensation is much easier and more predictable in operation than in the case of the known devices since the voltage/ temperature characteristic of both the p-n junction (base-emitter junction) of the transistor 10 and the p-n junction of the diode D are linear when a constant current is passed therethrough.

By comparing $V_{FLOW}$ with a reference level $V_{REF3}$ in a comparator 28, a signal to open a fuel flow valve (not shown) will be given by comparator 28 if $V_{FLOW}$ is above $V_{REF3}$ and a signal to close the valve will be given if $V_{FLOW}$ is below $V_{REF3}$.

Alternatively, instead of incorporating the comparator 28, the voltage $V_{FLOW}$ may be used directly to modulate the flow of air, for example by varying the speed of the fan.

The invention is not, of course, restricted to the use described above, between the fan and the burner of a heater, and can be used in many circumstances where a fluid flow is to be measured.

Figure 4:
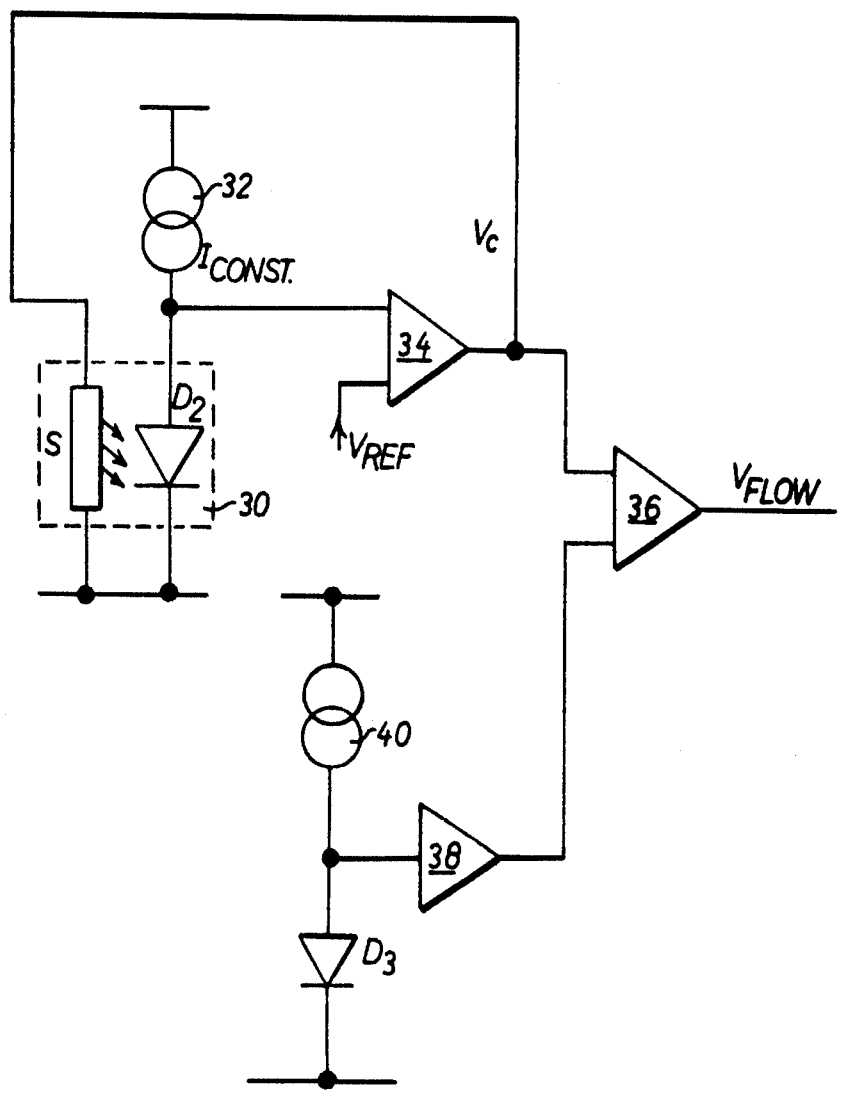
FIG. 4 is a schematic diagram of a second embodiment of a flow sensing device.

FIG. 4 shows an alternative embodiment of the flow sensor in which, instead of self-heating is in Fig.1, indirect heating of the first p-n junction is used. In this event, the first p-n junction need not be a transistor and can be second diode $D_2$. However, it is the necessary to provide a separate means of heating the diode $D_2$ and this is achieved by means of a heating device S which is arranged to be in thermal contact with the p-n junction of diode $D_2$, for example in or on a common, heat-conductive block 30.

A constant current is maintained in the diode $D_2$ by means of a constant current source 32 and the voltage across the junction of $D_2$ is monitored by an amplifier 34 and compared with a reference voltage $V_{REF}$. The output of amplifier 34 drives a current through the heating device S and also provides one input of a comparator 36. The second input of the comparator 36 is provided by a conditioning amplifier 38 which, depending on the voltage/power characteristic of the heating element S, may have a non-linear characteristic. This amplifier 38 monitors the voltage across a diode $D_3$ through which is passed a constant current from a constant-current source 40. As before, the diode $D_3$ is positioned so that its temperature varies only with the temperature of the air whose flow is to be measured.

In operation, if the junction of diode $D_2$ drops as a result of air flow across it, and the comparison of the voltage drop across the junction with the reference $V_{REF}$ causes amplifier 34 to provide an increased voltage to the heater S which is heated such as to heat the diode $D_2$ to its original temperature and thereby restore the original balance. The principle of operation is thus exactly the same as that of the embodiment of Fig.1. Thus, the signal $V_{FLOW}$ can, for example, be compared with a further reference, as in the case of $V_{REF3}$ of FIG. 1, or can be used directly.

Figure 5:
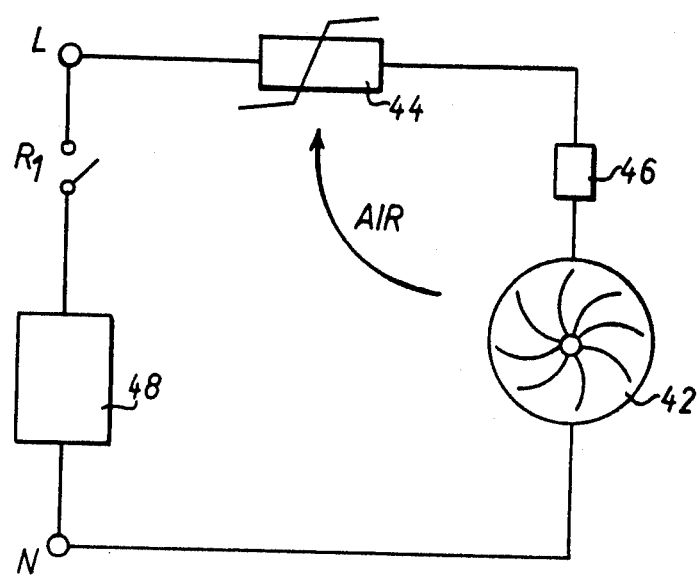
FIG. 5 is a schematic diagram of a third embodiment of flow sensing device.

A further embodiment of the invention is illustrated in FIG. 5. A fan 42 for impelling air into a burner of a water heater (not shown) is connected between the live L and neutral N wires of the mains supply, in series with a positive temperature coefficient device, in the form of a thermistor 44, and a relay coil 46. The graph of resistance against temperature for a thermistor is shown in FIG. 7, from which it can be seen that the resistance is relatively low up to typically about 120° C., at which point the resistance increases very rapidly.

A control sequencing unit 48, which controls a gas valve (not shown) regulating gas flow to the burner in a known manner, is connected across the mains terminals in series with a contact $R_1$ of the relay.

Figure 6:
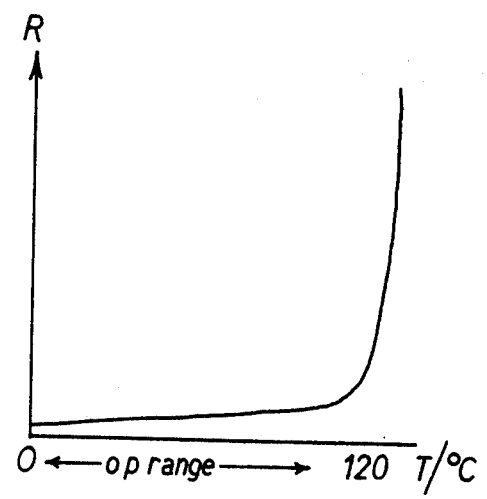
FIG. 6 is a graph of resistance against temperature for a typical positive temperature coefficient device used in the second embodiment.

The thermistor 44 is situated in the flow of air from the fan 42. When the fan is operated, the thermistor will be cooled and its resistance will be relatively low, thus allowing current to flow to the fan and through the relay 46. The relay contact $R_1$ will be closed and current is supplied to the control sequencing unit 48. Should, however, the fan cease to operate for any reason, the air will no longer be flowing past the thermistor and its temperature will increase, and so will its resistance, moving into the high resistance area on the graph of FIG. 6. Thus, very little voltage, almost zero in fact, will be applied to the fan and the relay. The relay contact $R_1$ thus opens and disconnects the control sequencing unit. In the event that the fan circuit should become open circuit for any reason, the current to the relay 46 ceases and the contact $R_1$ again opens, thus disconnecting the control sequency unit from the supply.

Thus, the gas valve is opened only when the fan is working normally and/or the fan circuit is not open circuit.

In another embodiment, the control sequencing unit 48 may be connected directly across the fan motor. In this event, it is necessary to include in series with the fan motor and the p.t.c. resistor 44 a current sensing device, such as an n.t.c. resistor, which acts to prevent the sequencer 48 from receiving full supply voltage in the event that the motor should go open circuit.

We claim:

1. A fluid flow sensing device comprising first and second p-n junctions, one of which is arranged, in use, to be disposed in the fluid flow to be measured and the other of which is arranged to be disposed at a position such that the temperature depends only on that of said fluid, means for monitoring the voltage drop across the first p-n junction, means for heating the first p-n junction, means for comparing the measured voltage drop across the first p-n junction with a reference level to provide a feedback voltage which is used to control the heating means of the first p-n junction in such a manner as to maintain the temperature of that junction constant irrespective of variations in the fluid flow and the fluid temperature, means for passing a current through the second p-n junction, means for monitoring the voltage drop across the second p-n junction, and means for comparing the voltage drop across the second p-n junction with said feedback voltage to provide a signal which is a function of fluid flow.

2. A fluid flow sensing device according to claim 1, wherein the first p-n junction is formed by the base-emitter junctions of a transistor, the latter junction being arranged to be heated by varying the collector voltage of the transistor whilst maintaining the collector current substantially constant.

3. A fluid flow sensor according to claim 2, comprising a constant voltage source whose voltage is applied to the base of said transistor, an operational amplifier which monitors the base-emitter voltage of the transistor, and a comparator which compares said base-emitter voltage with a predetermined voltage reference to provide said feedback signal, which is returned to the collector of the transistor to result in the self-heating of the transistor to an extent sufficient to maintain the measured base-emitter voltage of the transistor at a level set by said voltage reference.

4. A fluid flow sensor according to claim 2, wherein the second p-n junction is formed by a diode, and further comprising a constant current source which passes a constant current through said diode.

5. A fluid flow sensor according to claim 1, wherein the said first p-n junction is formed by a first diode, and further comprising a first constant current source which passes a constant current through said first diode, said heating means comprising a heating device supplied with a voltage dependent upon said feedback voltage.

6. A fluid flow sensor according to claim 5, wherein the second p-n junction is formed by a second diode, and comprising a further constant current source which passes a constant current through the second diode.

* * * * *